United States Patent [19]
Colwell et al.

[11] Patent Number: 5,454,348
[45] Date of Patent: Oct. 3, 1995

[54] HUMMINGBIRD FEEDER

[75] Inventors: Betsy P. Colwell, Foster, R.I.; Paul Graham, Worcester, Mass.

[73] Assignee: Droll Yankees, Inc., Foster, R.I.

[21] Appl. No.: 270,508

[22] Filed: Jul. 5, 1994

[51] Int. Cl.⁶ .................................................... A01K 7/00
[52] U.S. Cl. .................................................... 119/72
[58] Field of Search .............................. 119/72, 77, 57.8, 119/57.9, 52.2, 52.3, 52.4

[56] References Cited

U.S. PATENT DOCUMENTS

| | | | |
|---|---|---|---|
| 2,267,883 | 12/1941 | Wood | 119/77 |
| 2,887,988 | 5/1959 | Cottongim | 119/57.9 |
| 3,913,527 | 10/1975 | Kilham | 119/77 X |
| 5,291,855 | 3/1994 | Laverty | 119/57.9 X |
| 5,303,674 | 4/1994 | Hyde, Jr. | 119/77 |

Primary Examiner—Cary E. O'Connor
Assistant Examiner—Thomas Price
Attorney, Agent, or Firm—Salter & Michaelson

[57] ABSTRACT

A hummingbird feeder includes a top wall and a bottom wall, the top and bottom walls being joined at their peripheries to define an enclosure constituting a reservoir. A feeding station is positioned in the top wall, the feeding station comprising a feed opening in the top wall. A cleaning opening is provided in the top wall. The cleaning opening is of sufficient size for enabling the cleaning of the reservoir. A cap selectively covers the cleaning opening, the cap being movable for exposing the cleaning opening when it is desired to clean the reservoir. In another embodiment, an upwardly extending boss formed in the bottom wall has a downwardly opening bore adapted to receive therein a member for mounting the feeder in an upright position. Alternatively, a hook adapter having a hook for hanging articles from the feeder is threadably attached to the bottom wall.

10 Claims, 6 Drawing Sheets

5,454,348

HUMMINGBIRD FEEDER

BRIEF SUMMARY OF THE INVENTION

This invention relates generally to hummingbird feeders and more particularly to a hummingbird feeder having an interior which is easily accessible for cleaning and to a hummingbird feeder which is capable of being mounted on a pole.

This invention represents an improvement over the hummingbird feeder disclosed in U.S. Pat. No. 3,913,527 which discloses a hummingbird feeder having a number of relatively small feed openings and a slightly larger fill opening. Neither the fill opening nor the feed openings are of sufficient size for adequately cleaning the interior of the feeder. It is necessary to occasionally clean the feeder's interior since the aqueous sugar solution from which the hummingbirds feed becomes sticky and attracts dirt and grime if left uncleaned.

Prior hummingbird feeders, including the one disclosed in U.S. Pat. No. 3,913,527, are occasionally suspended from any suitable support (e.g., a tree branch or the like). Presently, there is a need for a hummingbird feeder which may alternatively be mounted on a pole, or if suspended, is capable of hanging articles, such as a suet bag or a second feeder, from the feeder.

Among the several objects of the present invention are the provision of a hummingbird feeder having an interior which is easily accessible for cleaning; the provision of such a hummingbird feeder which is capable of being selectively mounted in a position where it is suspended from a support or in a position where it mounts on a pole; the provision of such a hummingbird feeder having an adapter which makes it easy to mount the feeder on a pole; the provision of such a hummingbird feeder which is capable of hanging articles from the feeder when the feeder is suspended; the provision of such a hummingbird feeder which is easy to fill; and the provision of such a hummingbird feeder which is simple in design and easy to use.

The hummingbird feeder of the present invention comprises a top wall and a bottom wall, the top and bottom walls being joined at their peripheries to define an enclosure constituting a reservoir. One or more feeding stations are positioned in the top wall, the feeding stations comprising feed opening in the top wall. A cleaning opening is provided in the top wall, the cleaning opening being of sufficient size for enabling the cleaning of the reservoir. A cap selectively covers the cleaning opening and is movable for exposing the cleaning opening when it is desired to clean the reservoir.

In a second aspect of the invention, the hummingbird feeder comprises an upwardly extending boss formed in the bottom wall. The boss has a downwardly opening bore adapted to receive therein a member for mounting the feeder in an upright position.

In a third aspect of the invention, the hummingbird feeder comprises means associated with the top wall for mounting the feeder from an overhead support, a hook adapter having a hook for hanging articles from the feeder, and means for mounting the hook adapter on the bottom wall of the feeder.

Other objects, features and advantages of the invention shall become apparent as the description thereof proceeds when considered in connection with the accompanying illustrative drawings.

BRIEF DESCRIPTION OF THE DRAWINGS

Corresponding references designate corresponding parts throughout the several views of the drawings.

DETAILED DESCRIPTION OF THE PREFERRED EMBODIMENTS

Figure 1:
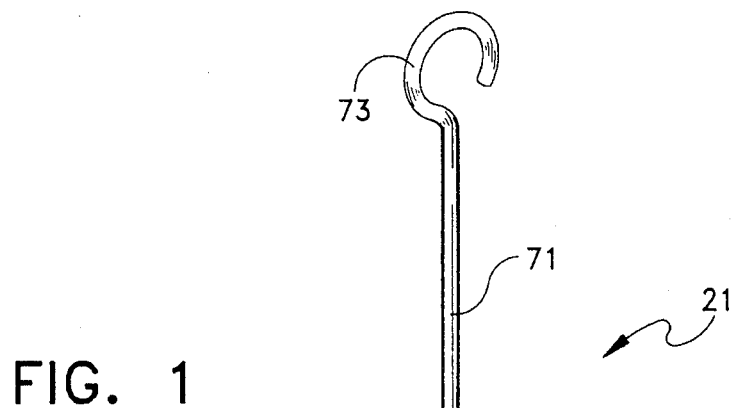
FIG. 1 is a perspective view of a hummingbird feeder of the present invention illustrating a first embodiment, the hummingbird feeder having a hook for suspending it from a support (not shown)
Figure 2:
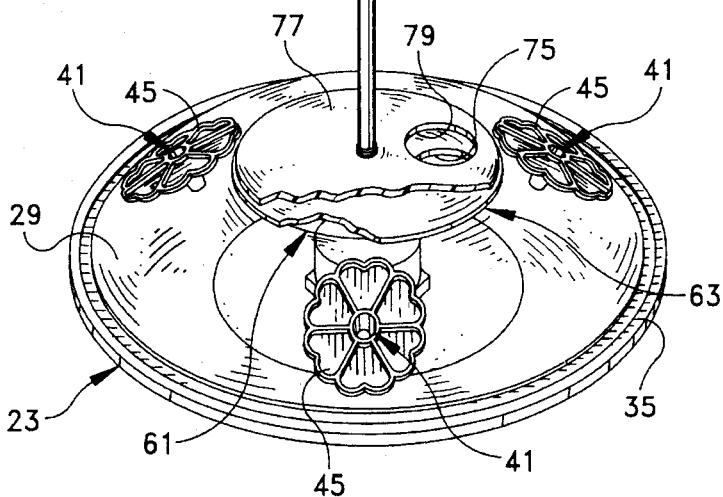
FIG. 2 is a perspective view of a hummingbird feeder of a second embodiment, the hummingbird feeder having a pole adapter for mounting it on a pole (not shown)
Figure 3:
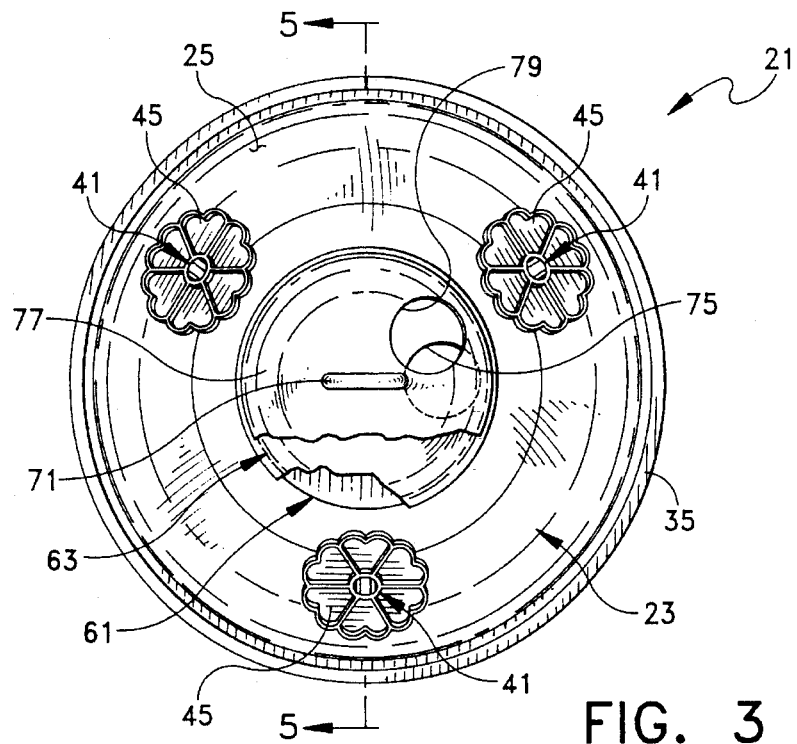
FIG. 3 is a top plan view of the hummingbird feeder of the first embodiment.

Referring to the drawings, and more particularly to FIGS. 1 and 3–6, there is generally indicated at 21 a hummingbird feeder illustrating a first embodiment of the present invention. Feeder 21 is an improvement of applicant's prior U.S. Pat. No. 3,913,527 which is incorporated herein by reference. Feeder 21 comprises a housing generally indicated 23 having a top wall 25 and a bottom wall 27, both of which are preferably formed or molded of plastic, such as clear acrylic. The top and bottom walls 25, 27 are joined at their peripheries to define an enclosure constituting a reservoir 29. The top and bottom walls 25, 27 both have a substantially circular peripheral margin defined by outwardly extending flanges 31, 33, respectively. The flanges 31, 33 mate with each other and are sealingly secured to each other by any suitable means such as adhesive 34. An elongated U-shaped channel member 35, preferably fabricated from metal material, is clamped around the sealed flanges 31, 33 (FIG. 7) and is secured to the flanges by gluing or cementing.

Figure 4:
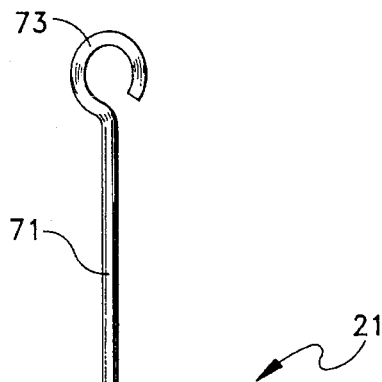
FIG. 4 is an elevation view thereof.

As viewed in FIG. 4, the housing 23 is generally disk-shaped when viewed in side elevation. The top wall 25 is provided with a plurality of feeding stations, each generally indicated 41. Each feeding station 41 comprises a circular opening 43 (FIG. 5) formed in the top wall 25, the opening 43 being located adjacent to but spaced from the peripheral flange 31 of the top wall. An insert member 45 is tightly fitted within each opening 43. Each insert member 45 comprises a top flange 47 and an elongated tapered tube 49 which extends through the opening 43 into the interior of the reservoir 29. The bottom surface of the flange 47 engages the outer surface of the top wall 25 and is secured thereto by any suitable means, such as cementing or the like. The tube 49 is specifically designed so that a hummingbird's bill passes therethrough for drawing the aqueous sugar solution from the reservoir 29.

Figure 5:
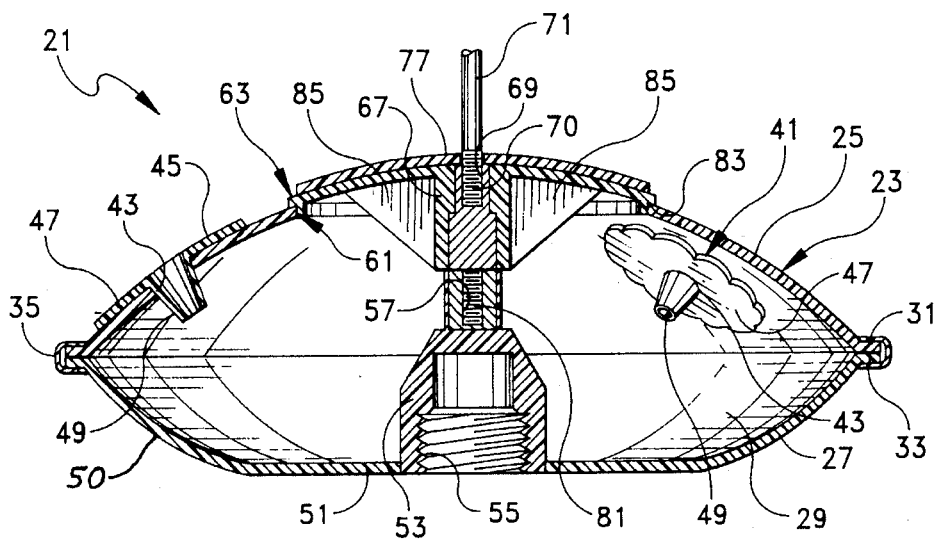
FIG. 5 is a cross-sectional view taken along line 5—5 of FIG. 3.

The bottom wall 27 has a downwardly and inwardly sloping portion 50 which merges with a bottom flat section 51 (FIGS. 4 and 5). Centrally located in the bottom flat section 51 of the bottom wall 27 is an integral, upwardly extending boss 53 having a downwardly facing, internally threaded bore 55 accessible from underneath the bottom wall 27, and an upwardly facing, internally threaded bore 57 accessible from above the bottom wall 27. The purpose of these bores 55, 57 will be described hereinafter.

The hummingbird feeder 21 described up to this point is substantially identical to the feeder disclosed in U.S. Pat. No. 3,913,527 except for the provision of boss 53. The present invention incorporates a relatively large, circular cleaning opening generally indicated 61 provided in the top wall 25 of the feeder 21. The cleaning opening 61 is sufficiently sized to facilitate the cleaning of the interior of the reservoir 29. As shown best in FIG. 5, the housing 13 further includes a cap generally indicated 63, releasably securable by attachment means to the bottom wall 27 of the feeder 21 having the internally threaded bore 57 for selectively covering the cleaning opening 61. The cap 63 is gently rounded to conform to the curvature of top wall 25 and at its top central portion is provided with an integral, downwardly extending boss 67 (FIG. 5) having an upwardly facing, internally threaded bore 69 for receiving the terminal threaded portion 70 of an elongated hanging rod 71. The hanging rod 71 has a hook portion 73 at its upper end for hanging the feeder 21 from any suitable support, for example, a tree branch.

Adjacent the top central portion of cap 63, but slightly spaced therefrom, there is provided a circular filling aperture 75 through which the aqueous sugar solution may be poured when it is desired to fill the feeder 21. The filling aperture 75 is larger than the feed openings 43 and smaller than the cleaning opening 61. In order to cover the filling aperture 75, a domed-shaped cover 77 is positioned over the cap 63 and is rotatably mounted on the hanging rod 71. The cover 77 is shaped to conform to the curvature of the cap 63 as illustrated in FIG. 4. The cover 77 is provided with a circular opening 79 of generally the same size as the filling aperture 75 and is adapted to register with the filling aperture 75 when the cover 77 is rotated so that the opening 79 and aperture 75 are in alignment. In such a position, the aqueous sugar solution may easily be poured into the feeder 21 and then, after the feeder 21 has been filled to the desired level, the cover 77 is slightly rotated to a position where the opening 79 and aperture 75 are out of alignment with respect to each other so that the cover 77 overlies the aperture 75.

Figure 6:
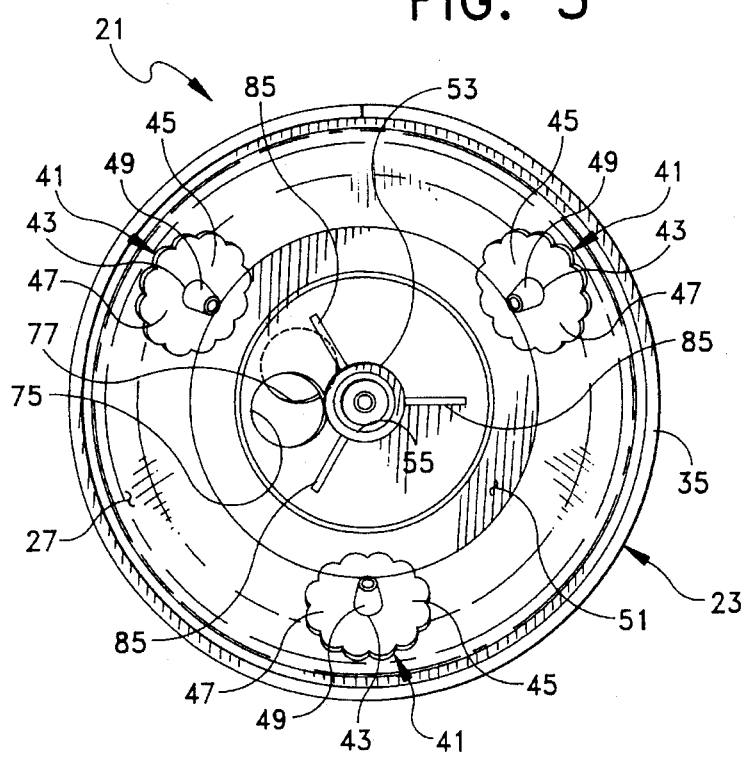
FIG. 6 is bottom plan view thereof.
Figure 7:
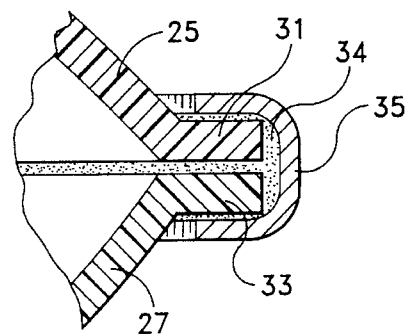
FIG. 7 is an enlarged, fragmentary cross-sectional view illustrating the joinder of a top wall and a bottom wall of the hummingbird feeder of both embodiments.
Figure 8:
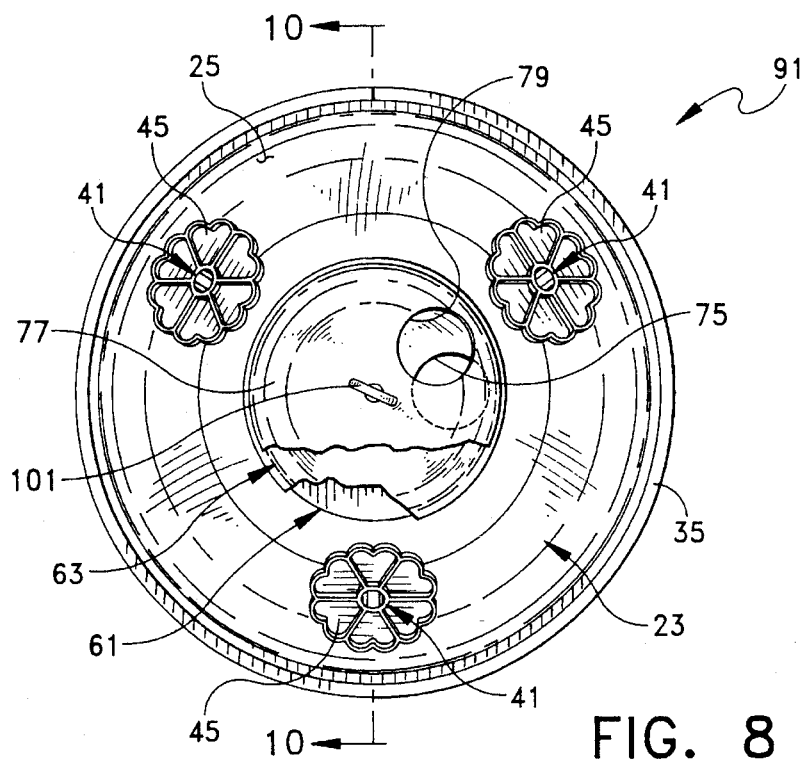
FIG. 8 is a top plan view of the hummingbird feeder of the second embodiment.
Figure 9:
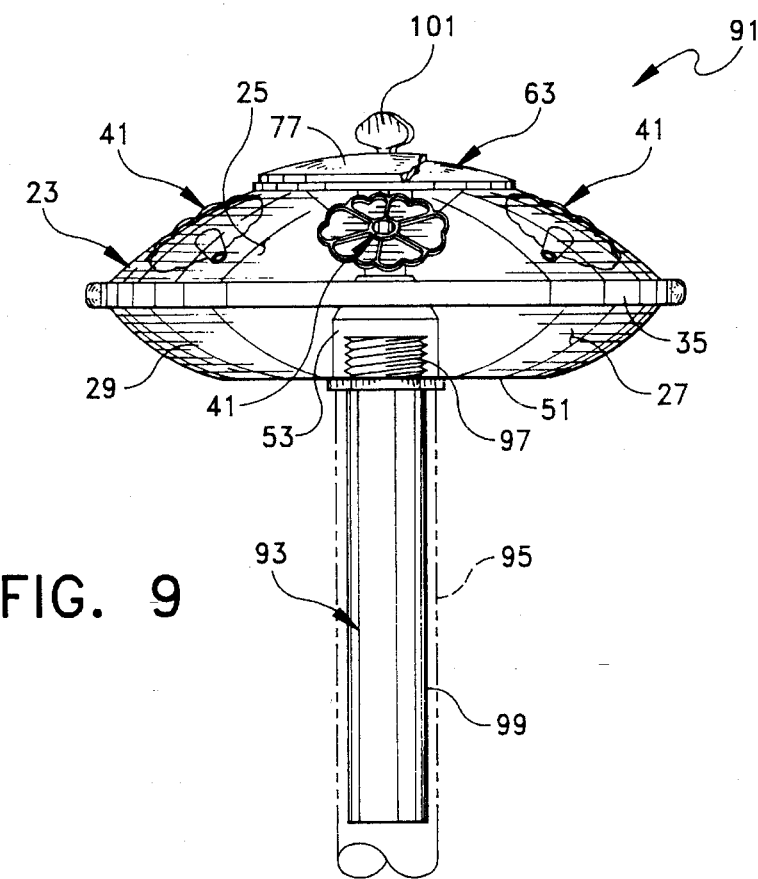
FIG. 9 is an elevational view thereof, a pole on which the feeder mounts being shown in broken lines.
Figure 10:
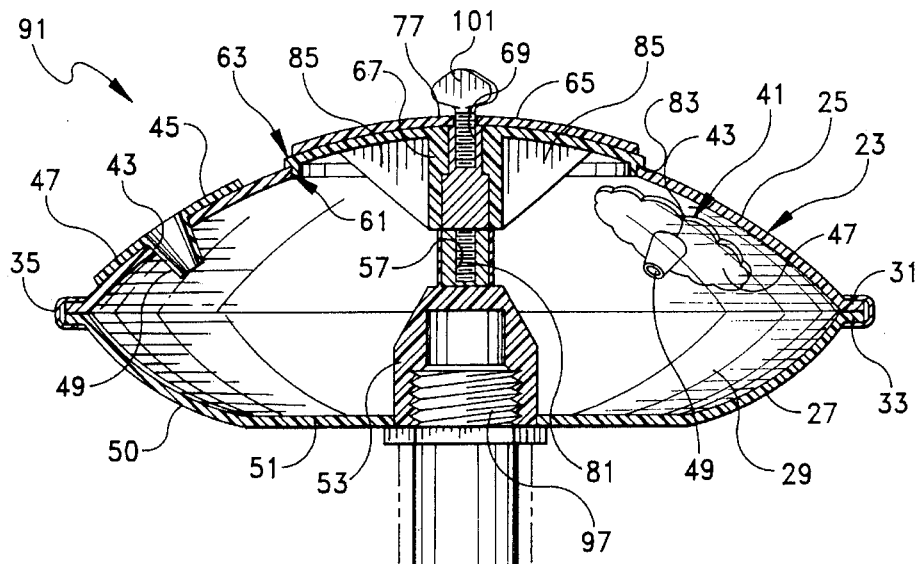
FIG. 10 is a cross-sectional view taken along line 10—10 of FIG. 8.
Figure 11:
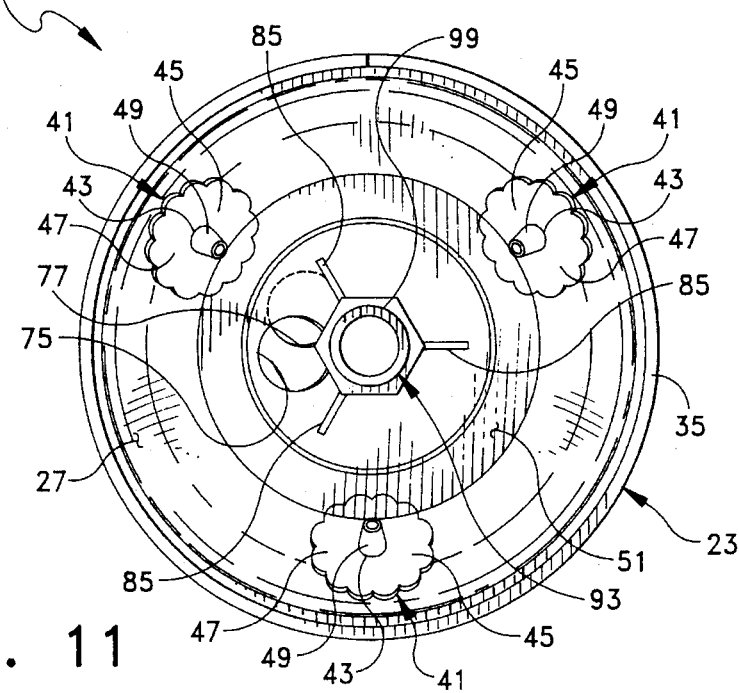
FIG. 11 is a bottom plan view thereof.

For releasably fastening the cap 63 to the bottom wall 27 of the housing, the cap 63 further comprises an externally threaded stud 81 which extends downwardly from the bottom surface of the boss 67 for fastening the cap 63 on the feeder 21. Specifically, the cap stud 81 is threadably fastened to the upwardly facing, internally threaded bore 57 formed in the upper surface of the bottom wall boss 53. An annular, downwardly extending shoulder 83 (FIG. 5) is formed along the outer edge of the cap 63 and is sized to engage the edge of the cleaning opening 61. When attached to the feeder 21, the cap 63 sealingly engages the edge of the cleaning opening 61 for preventing the spillage of solution out of the feeder 21 and the unwanted infestation of insects or flow of liquids into the feeder. As illustrated in FIGS. 5 and 6, the boss 67 is centrally located on the cap 63 and three triangular-shaped webs 85, each extending radially outwardly from the side wall of the boss 67 and terminating near the outer edge of the cap 63, are provided for strengthening purposes.

The hummingbird feeder 21 of the first embodiment is assembled by threadably securing the cap 63 into the bore 57 provided in the boss 53 of the bottom wall 27 until the shoulder 83 is seated on the edge of the cleaning opening 61. Aqueous sugar solution may then be poured into the reservoir 29 of the feeder 21 through the filling aperture 75 for filling the feeder. The cover 77, which has a diameter substantially equal to the diameter of the cap 63, is then placed over the cap 63 and secured to the cap by the hanging rod 71. The cover 77 is rotated so that it overlies the filling aperture 75. The feeder 21 may then be supported by the hanging rod 71 from any suitable support. Periodic cleaning of the feeder 21 may be accomplished by removing it from the support and unscrewing the feeder 21 from the hanging rod 71. The cover 77 is then removed to expose the cap 63 which is unscrewed from the bottom wall boss 53 thereby exposing the cleaning opening 61. The cleaning opening 61 is of sufficient size so that the interior surfaces of walls 25, 27 of the feeder 21 may be cleaned by any suitable implement, such as a brush (not shown). After the feeder 21 is cleaned, it may be reassembled in the manner described above.

FIGS. 2 and 8–11 illustrate an alternate embodiment hummingbird feeder 91. The hummingbird feeder 91 illustrated in these figures is substantially identical to the one shown in FIGS. 1 and 3–7 except that it is mounted on a pole instead of being suspended by a hanging rod. Like parts of feeder 91 are designated with identical reference numerals used to reference parts of feeder 21. As mentioned above, the boss 53 of the bottom wall 27 of the housing 13 is provided with a downwardly facing, internally threaded bore 55 which is accessible from underneath the bottom wall 27. In the shown embodiment, the bore 55 receives therein a member, such as a pole adapter, generally indicated 93, for mounting the feeder 91 in an upright position on a pole 95 (shown in broken lines in FIGS. 9 and 10).

As illustrated, at its upper end, the pole adapter 93 has an externally threaded end portion 97 which is threadably received in the bore 55 of the bottom wall 27. At its lower end, the pole adapter 93 has a tubular extension 99 (see FIG. 10) capable of being inserted into a tubular end of pole 95. The extension 99 slides into the tubular end of the pole 95 thereby enabling a person to easily mount the feeder 91 on the pole or remove the feeder from the pole. However, it is to be understood that a pole having a threaded end portion (similar to end portion 97 of adapter 93) may be directly threadably attached to the downwardly facing bore 55 provided in the boss 53 of the bottom wall 27 of the feeder 91 without using the pole adapter 93. The pole adapter 93 makes it easier for the person to remove the feeder 91 from the pole 95 when either filling the feeder with aqueous sugar solution or when cleaning its interior. A thumbscrew 101 maintains the cover 77 assembled to the cap 63 of the feeder 91, while at the same time permitting the desired rotation of cover 77.

Figure 12:
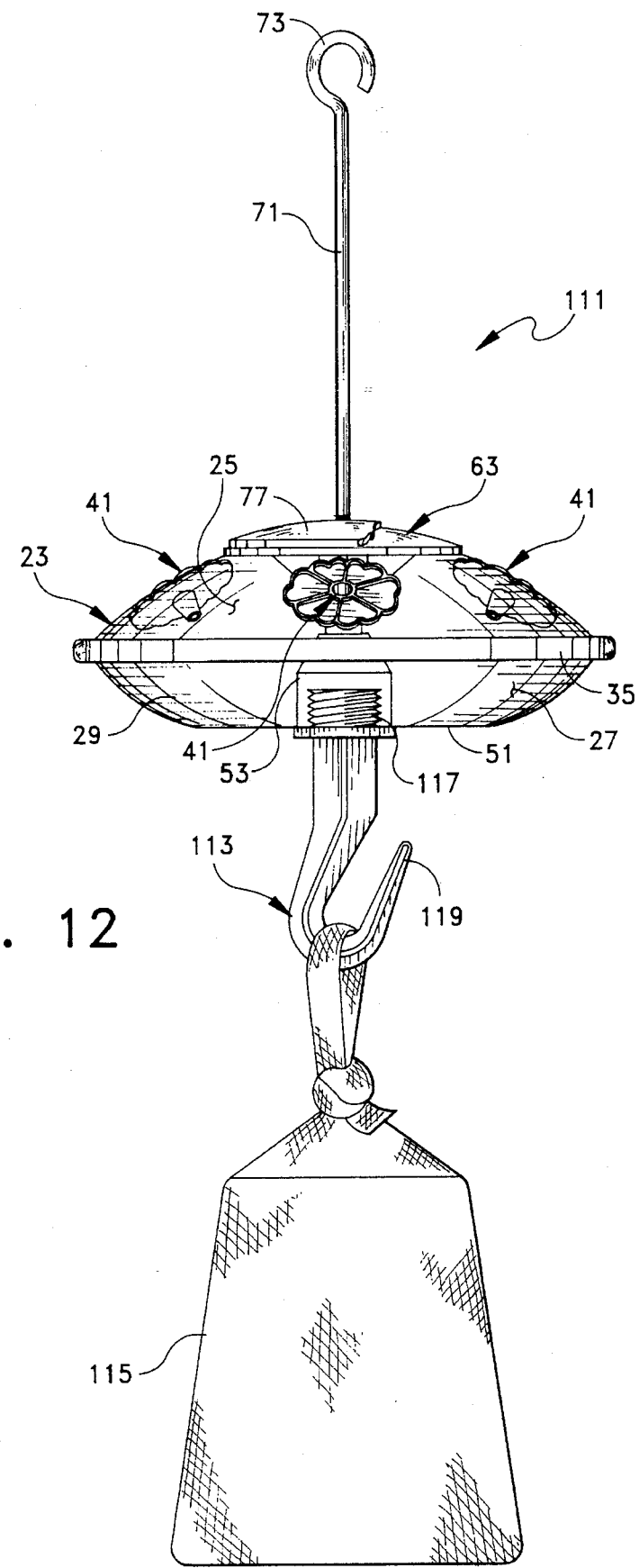
FIG. 12 is an elevational view of the hummingbird feeder of the first embodiment having a hook adapter for hanging articles from the feeder.

FIG. 12 illustrates a feeder 111, identical to the feeder of the first embodiment in that it is suspended from a support by hanging rod 71. Feeder 111 comprises a hook adapter generally indicated 113 for hanging an article 115, such as a suet bag, from the bottom wall 27 of the feeder 111. Suitable means mounts the hook adapter on the bottom wall of the housing. In the shown embodiment the mounting means comprises a threadable connection. The hook adapter 113 has at its upper end an externally threaded end portion 117 which is threadably received in the bore 55 provided in the boss 53 of the bottom wall 27 of the feeder 111. At the lower end of the hook adapter 113, a hook 119 is provided for hanging the article 115, which instead of being a suet bag, could be another feeder (not shown).

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hummingbird feeder comprising a top wall, a bottom wall, said top and bottom walls being joined at their peripheries to define an enclosure constituting a reservoir, a feeding station positioned in said top wall, said feeding station comprising a feed opening in said top wall, a cleaning opening provided in the top wall, said cleaning opening being substantially larger than said feed opening and of sufficient size for enabling the cleaning of the reservoir, a cap for selectively covering the cleaning opening, said cap being movable for exposing the cleaning opening when it is desired to clean the reservoir, and means releasably attaching the cap to the bottom wall of the feeder.

2. The hummingbird feeder as set forth in claim 1, said attaching means comprising a threaded stud associated with one of the cap and bottom wall of the feeder and an internally threaded bore associated with the other of the cap and bottom wall.

3. The hummingbird feeder as set forth in claim 2 wherein said cap has a downwardly extending, externally threaded stud and said bottom wall includes a boss having an upwardly opening, internally threaded bore, said stud being receivable in the bore for attaching the cap to the bottom wall of the feeder.

4. The hummingbird feeder as set forth in claim 1 wherein said cap has a filling aperture formed therein for filling the reservoir, said filling aperture being larger than said feed opening and smaller than said cleaning opening.

5. The hummingbird feeder as set forth in claim 4 further comprising a cover for selectively covering the filling aperture, said cover being movable for exposing the filling aperture when it is desired to fill the reservoir.

6. The hummingbird feeder as set forth in claim 5 wherein said cover is shaped to conform to the cap and is rotatably attached thereto.

7. The hummingbird feeder as set forth in claim 6 wherein said cover has an opening formed therein generally the same size as the filling aperture, said opening of the cover being adapted to register with the filling aperture when the cover is rotated so that the opening and aperture are in alignment.

8. A hummingbird feeder comprising a top wall, a bottom wall, said top and bottom walls being joined at their peripheries to define an enclosure constituting a reservoir, a feeding station positioned in said top wall, said feeding station comprising a feed opening in said top wall, a cleaning opening provided in the top wall, said cleaning opening being substantially larger than said feed opening and of sufficient size for enabling the cleaning of the reservoir, and a cap releasably attached to the enclosure for selectively covering the cleaning opening, said cap being movable for exposing the cleaning opening when it is desired to clean the reservoir, said cap having a downwardly extending, externally threaded stud and said bottom wall including a boss having an upwardly opening, internally threaded bore, said stud being received in the bore for releasably attaching the cap to the bottom wall of the feeder.

9. A hummingbird feeder comprising a top wall, a bottom wall, said top and bottom walls being joined at their peripheries to define an enclosure constituting a reservoir, a feeding station positioned in said top wall, said feeding station comprising a feed opening in said top wall, a cleaning opening provided in the top wall, said cleaning opening being substantially larger than said feed opening and of sufficient size for enabling the cleaning of the reservoir, a cap secured to said enclosure for selectively covering the cleaning opening, said cap being movable for exposing the cleaning opening when it is desired to clean the reservoir, said cap having a filling aperture formed therein for filling the reservoir, said filling aperture being larger than said feed opening and smaller than said cleaning opening, and a cover secured to said enclosure for selectively covering the filling aperture, said cover being movable for exposing the filling aperture when it is desired to fill the reservoir.

10. A hummingbird feeder comprising a top wall, a bottom wall, said top and bottom walls being joined at their peripheries to define an enclosure constituting a reservoir, a feeding station positioned in said top wall, said feeding station comprising a feed opening in said top wall, means associated with the top wall for mounting the feeder, a hook adapter having a hook for hanging articles from the feeder, and means for mounting said hook adapter on the bottom wall, said means for mounting said hook adapter comprising a downwardly opening, internally threaded bore formed in the bottom wall, said hook adapter comprising at one end thereof an externally threaded end portion and at its other end a hook, said threaded end portion of the hook adapter being threadably received in said bore of the bottom wall of the feeder for hanging articles from the feeder.

* * * * *